United States Patent [19]

Kastendieck et al.

[11] Patent Number: 4,737,023
[45] Date of Patent: Apr. 12, 1988

[54] BINOCULAR PERISCOPE VIEWING DEVICE INCLUDING TRIPLE PRISM FOR IMAGE SPLITTING

[75] Inventors: William A. Kastendieck, Wylie; Robert Wallace, Garland, both of Tex.

[73] Assignee: Varo, Inc., Garland, Tex.

[21] Appl. No.: 884,731

[22] Filed: Jul. 11, 1986

[51] Int. Cl.$^4$ .................. G02B 23/04; G02B 23/12; G02B 23/08; G02B 27/10

[52] U.S. Cl. .................. 350/538; 350/542; 350/171; 350/286

[58] Field of Search ............... 350/538, 539, 542, 541, 350/540, 543, 544, 171, 287, 286, 145, 137, 276 SL, 511–516

[56] References Cited

U.S. PATENT DOCUMENTS

| 2,693,128 | 11/1954 | Dewhurst | 350/137 |
|---|---|---|---|
| 4,261,646 | 4/1981 | Kotaka | 350/287 |
| 4,309,078 | 1/1982 | Hara et al. | 350/276 SL |
| 4,383,741 | 5/1983 | Vogl et al. | 350/538 |
| 4,634,223 | 1/1987 | Ishii | 350/276 SL |

FOREIGN PATENT DOCUMENTS 1273376 7/1968 Fed. Rep. of Germany ...... 350/542

Primary Examiner—Jon W. Henry
Attorney, Agent, or Firm—Jerry W. Mills; Roger N. Chauza; Jefferson Perkins

[57] ABSTRACT

A binocular periscope (10) viewer includes a columnar glass prism (52) disposed in a vertical optical path (24) and an angled internal reflective surface (51) for redirecting the image from a horizontal path (22) downwardly to a vertical optical path (24). An objective lens assembly (54), a night vision image intensifier tube (56) and a collimator (58) are all disposed in the vertical optical path (24) and further condition the image for presentation to a triple prism (60). The triple prism (60) includes a first prism (62) integral with a second prism (64) and a third prism (66). Prism (62) is disposed in the vertical optical path (24) and redirects the image into a forward horizontal optical path (70). Each of prisms (64, 66) receive essentially the entire redirected image, and further redirect such image into oppositely directed lateral horizontal optical paths (26, 28). The triple prism (60) is mounted to a cradle (106) which is secured to the frame (12) of the viewing system. Turning mirrors (90, 92) redirect the image into parallel common forward horizontal paths (30, 32) for individual viewing by an observer.

8 Claims, 2 Drawing Sheets

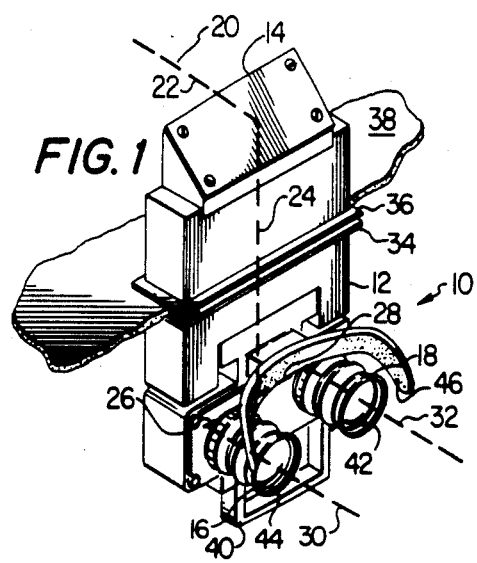
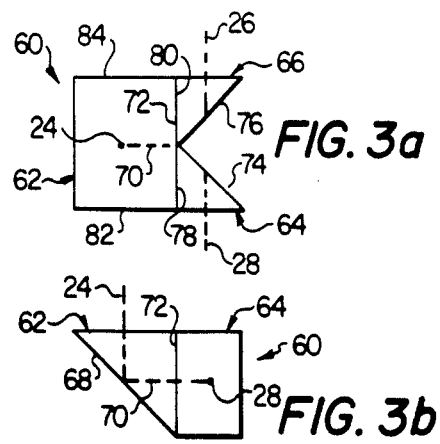
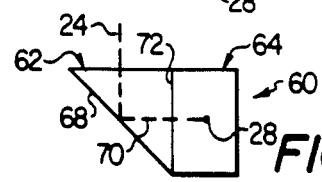
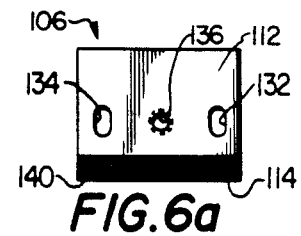
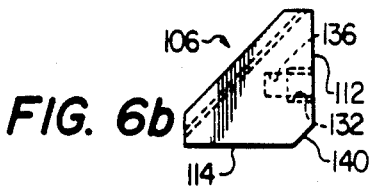
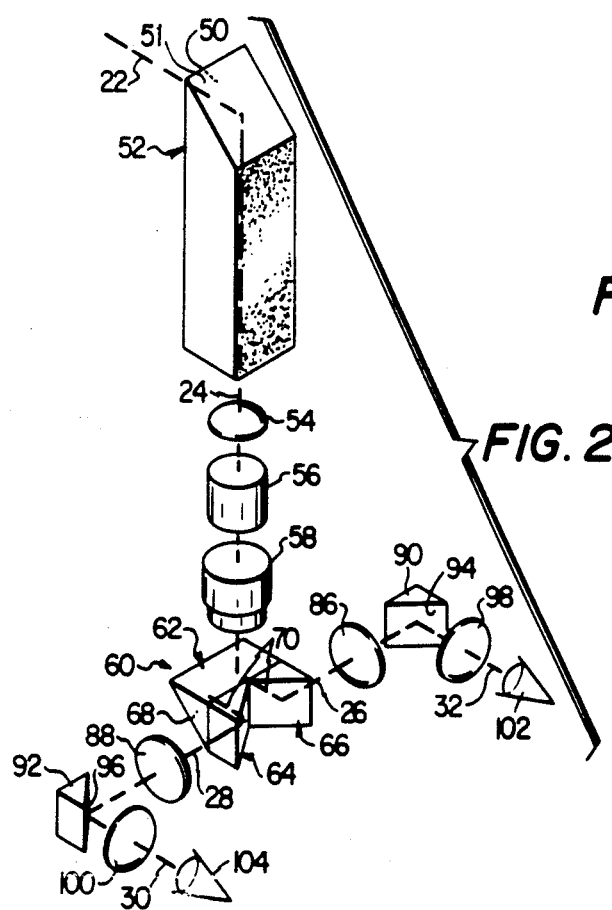
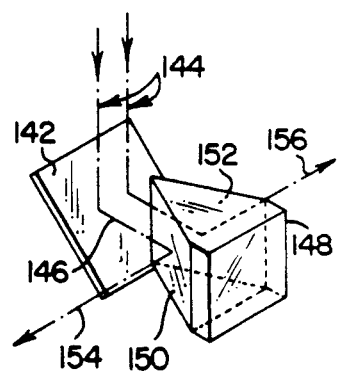

BINOCULAR PERISCOPE VIEWING DEVICE INCLUDING TRIPLE PRISM FOR IMAGE SPLITTING

TECHNICAL FIELD OF THE INVENTION

The present invention relates in general to optical systems, and more particularly relates to an image splitting device for presenting two images to an observer.

BACKGROUND OF THE INVENTION

There are many situations in which it is desirable for a viewing system to be remotely located from a point of observation. For example, a person may desire to remain in a hidden or protected environment, but with the use of viewing apparatus be able to observe distant objects. Periscopes comprise such apparatus and are highly advantageous when used in connection with marine vessels or ground vehicles. Submarines and armored tanks, for example, employ such apparatus which are beneficial to military personnel.

A rudimentary periscope includes upper and lower canted reflective mirrors for redirecting an image in a horizontal displaced or offset manner. A person can thus look into the bottom mirror and observe the object image reflected thereon by the top mirror. The image as observed by both eyes of the person is identical, as it is reflected from a single planar surface.

More sophisticated optical viewing systems which route the image in an offset horizontal manner include provisions for the optical correction of the image as individually presented to each eye of the person. This individual optical or diopter correction requires the image to be split and redirected in separate optical paths toward the respective eyes of the person. Separate eyepieces are provided to accomplish such optical correction. Separate eyepieces not only allow for individual optical adjustment of each eyepiece, but also allow for interpupilary or physical positioning with regard to the eye spacing of various individuals. Separate eyepieces also prevent ambient light from affecting the presentation of the image to the observer.

U.S. Pat. No. 4,463,252 discloses one approach conventionally employed in splitting the image of an observed object. The technique employed in the noted patent is to place a reflective member with two angled reflective surfaces within the optical path. In this manner, a portion of the image is reflected in a single plane from one surface in one direction while the remaining portion of the image is reflected from the other surface in another direction. Typically, a right angled reflective member with polished or mirrored surfaces is placed in the optical path to split the image into oppositely directed directions. The routing of the image through the planar optical path is of little aid in periscope-type equipment where the image must traverse a three dimensional optical path.

It can be seen from the foregoing that a need has arisen for an image splitter which can redirect an image through a three dimensional optical path.

SUMMARY OF THE INVENTION

In accordance with the present invention, an image splitter is disclosed which substantially reduces or eliminates the disadvantages associated with the prior art optical apparatus.

According to the invention, there is provided an image splitter for use in a viewing system having a pair of eyepieces through which substantially identical images of an object can be observed. The exemplary viewing system includes horizontal and vertical optical paths through which an image of the object is transferred.

A triple prism having three internally reflecting surfaces is located in the vertical optical path for redirecting and splitting the image into a pair of oppositely directed horizontal optical paths. The triple prism is preferably an integral solid including three internal reflective surfaces, one for redirecting the image of the vertical optical path into a horizontal forward optical path, and the other two reflective surfaces for redirecting the image of the forward optical path orthogonally into oppositely directed horizontal lateral paths. The integral nature of the triple prism reduces the equivalent air thickness of the optical paths, thus reducing undesirable vignetting due to loss of light rays. The triple prism is fixed to a cradle which is located and fastened by registration means within the viewing system frame so as to be aligned with vertical and horizontal optical paths.

A pair of turning mirrors redirect the oppositely directed lateral images into a parallel common forward direction for individual observing through the twin eyepieces.

In an alternative embodiment, the image splitter comprises three external reflective surfaces. One surface comprises a planar reflective surface oriented so as to reflect the image of the vertical optical path toward a prism having a pair of external reflective surfaces. Each prism reflective surface is angled such that the image incident thereto from the planar surface is split and again reflected in opposite directions.

BRIEF DESCRIPTION OF THE DRAWINGS

Further features and advantages of the present invention will become apparent from the description of an illustrative embodiment thereof, taken in conjunction with the accompanying drawings, in which:

FIG. 1 is an isometric view of a binocular periscope incorporating the image splitter of the invention;

FIG. 2 is an exploded isometric view of the optical components of the periscope system, with the image splitter disposed in both the vertical optical path and the horizontal optical path;

FIGS. 3a and 3b are respective top and side elevational views of the triple prism constructed in accordance with the invention;

FIGS. 6a and 6b are respective back and side views of the triple prism cradle; and FIG. 7 is an isometric view of an alternative embodiment of an image splitter constructed according to the invention.

DETAILED DESCRIPTION OF THE INVENTION

Figure 4:
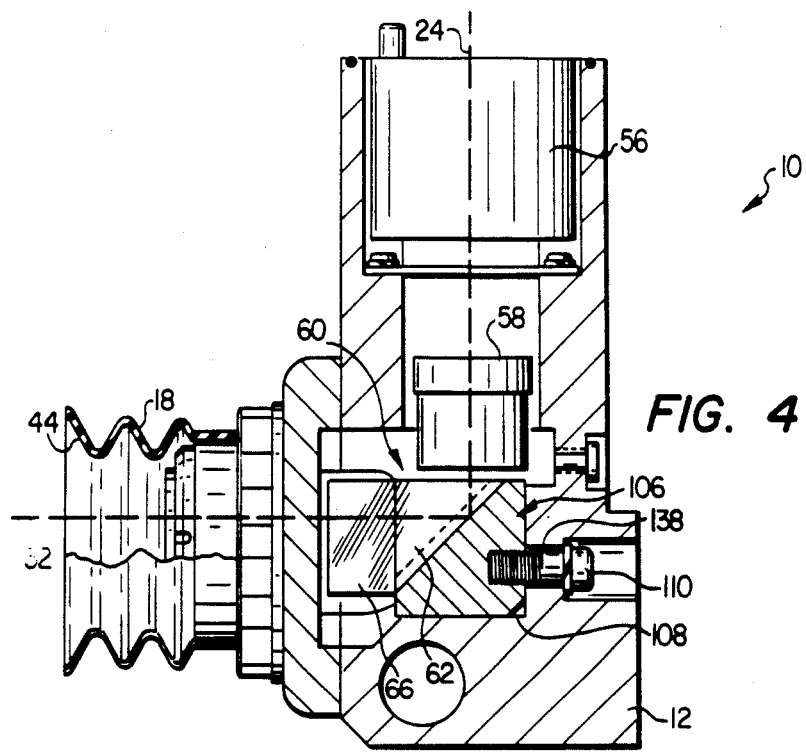
FIG. 4 is a sectional view of a portion of the viewing system, illustrating the fixed position of the triple prism therein.

The invention is best understood by referring first to FIG. 1 of the drawings. The viewing system 10 is a binocular type of periscope system. By this it is meant that dual images are presented to an observer, as redirected in a circuitous optical path from a remote location. The viewing system 10 includes an elongate frame 12 with an upper opening 14 into which the image of a distant object enters. The frame 12 further includes a pair of eyepieces 16 and 18 located at the bottommost part of the frame 12. Substantially identical images of the object can be viewed through the eyepieces 16 and 18. The provision of individual eyepieces 16 and 18 enable the user to tailor the optical correction to each eye by individual diopter and interpupilary adjustments.

The dashed line 20 indicates the three dimensional optical path traversed by the image when routed through the viewing system 10. The optical path 20 includes an upper horizontal path 22, a vertical optical path 24 and oppositely directed lateral horizontal paths 26 and 28. Finally, the viewing system 10 provides parallel common forward horizontal optical paths 30 and 32 directed through respective eyepieces 16 and 18.

The exemplary viewing system 10 is illustrated for use in connection with an armored land vehicle. The viewing system frame 12 includes a flange 34 and a combination flange and gasket 36 for fixing the system to the armor shell 38 of the land vehicle. An armored protective cover (not shown) may be disposed partially over the top portion of the frame 12 extending above the armor shell 38. A handle 40 is provided for removing and carrying the viewing system 10 in the event it is to be replaced by a system of another type, e.g., a system capable for viewing objects at day or night. The eyepieces 16 and 18 include peripheral cushions 42 and 44 for adaption to the facial features of the observer. Also provided is a cushioned brow pad 46 against which the forehead of the observer may be rested during extended periods of viewing.

The principles and concepts of the present invention are described herein in terms of a viewing system 10 incorporating night vision capabilities. As will be described in more detail below, the present invention allows the image to be processed in a single optical path, and then split into two images for viewing. Owing to the fact that night vision equipment, such as an image intensifier tube, is extremely expensive, the use of only one such item before splitting the image is preferable. While other systems may duplicate all the optical apparatus to provide twin viewing of the object, such an approach is cost prohibitive when using night vision equipment.

The vertical and various horizontal optical paths of the viewing system 10 are shown in more detail in FIG. 2. The image of the distant object is introduced horizontally into the viewing system 10 along line 22 through the frontal face 50 of a head prism 52, and redirected downwardly by the angled internal reflecting surface 51. Reflecting surface 51 may be silvered or otherwise constructed as a mirrored surface. The reflective surface 51 is part of the head prism 52 having a vertically elongate column of glass through which the image of the object passes. Because the index of refraction of the glass head prism 52 is greater than that of air, the light rays forming the image remain concentrated within the head prism 52, rather than being dispersed outwardly and lost. As a result, because a portion of the vertical optical path is constructed with glass, the image retains a substantial amount of its original brightness, and thus the quality of the image is not degraded. The head prism 52 is constructed of a glass known as BK-7 having an index of refraction of about 1.52.

There is aligned with the head prism 52 within the optical path 24 an objective lens assembly 54. The objective lens assembly 54, while shown as a single lens, may be a group of lenses for maintaining the quality of the image as transferred from the head prism 52 to an image intensifier tube 56. Among other things, the objective lens assembly 54 focuses the image on the image intensifier tube 56, corrects for any optical anomalies within the head prism 52, and maintains the field of view substantially as established by the head prism 52. The single image intensifier tube 56 provides magnification of dimly lit objects so that the magnified image is easily visible. With such a device, starlight provides sufficient illumination to display objects with a high degree of detail. The image is then transferred from the image tube 56 to a collimator assembly 58 which provides further optical correction.

The triple prism 60 of the invention comprises a first glass prism 62, a second glass prism 64 and a third glass prism 66. Each prism 62-66 is constructed in the shape of a triangular wedge of glass, as particularly shown by the views of FIGS. 3a and 3b. Prism 62 includes an angled face 68 having an internal reflective surface disposed in the vertical optical path 24 for redirecting the object image into forward horizontal optical paths 70. The prism 62 has a cross-sectional shape similar to that of a regular right triangle, with the angled face 68 forming the hypotenuse. With this configuration, the vertical optical path 24 is redirected orthogonally into a general forward horizontal optical path 70 toward its vertical surface 72 (FIGS. 3a and 3b). While the various optical paths are shown as lines, the image of the object within the viewing system 10 is actually columnar in cross section. Therefore, substantially the entire image of the object is projected on the vertical surface 72 of prism 62.

Prisms 64 and 66 are each identical to one another, and also have a cross-sectional shape similar to that of a regular right triangle. Each prism 64 and 66 further includes a respective angled face 74 and 76. Associated with each angled face 74 and 76 is an internal reflective surface for redirecting the forward optical path 70 to opposing lateral optical paths 26 and 28. Prism 64 is mounted to the vertically oriented face 72 of prism 62, with the angled face 74 being oriented vertically and angled inwardly toward the center of face 72 of prism 62. Prism 66 is similarly mounted to the vertical face 72 of prism 62, but in a reversed manner. Prisms 64 and 66 are bonded to prism 62 in the positions noted by a suitable optical cement. While the triple prism 60 of the preferred form of the invention is constructed using three individual prisms, a unitary glass structure could be ground so as to achieve the overall shape as shown in the figures.

In accordance with an important feature of the invention, prisms 64 and 66 receive on respective faces 78 and 80 from prism 62 essentially a full image of the object. The reflective internal surface of face 76 of prism 66 redirects the image of forward horizontal optical path 70 into an orthogonal lateral horizontal optical path 26. Since the reflective surface of face 74 of prism 64 is reversed with respect to that of prism 66, prism 64 redirects the image of forward horizontal optical path 70 into an opposite lateral orthogonal horizontal optical path 28. Moreover, because of the reverse orientation of reflective surfaces of faces 74 and 76, horizontal optical path 28 is projected in a direction opposite that of horizontal optical path 26. From the foregoing, it can be seen that with the triple prism 60 of the invention, the full image of the object has been split and redirected in separate directions without a compromise in the amount of light or quality of the image projected. This is in contrast with image splitters using only mirrors which essentially transmit about one-half of the object image in separate directions.

In accordance with another feature of the invention, the integral nature of prisms 62-66 provides a non-air medium through which the routing of the image is accomplished. The glass with which each prism 62-66 is constructed is identical, and thus the index of refraction of each such prism is the same. This effectively reduces the length of the equivalent air optical path, thus placing the collimator 58 closer to the lenses 86 and 88. The geometric separation between the collimater 58 and the lenses 86 and 88 is reduced by a factor of 1/N, when N is the index of refraction of the glass prism 60. With a typical index of refraction of about 1.5 for optical glass, the effective or equivalent air optical path is reduced about 66%. By using a solid triple prism 60, the adjacent equipment in the optical path appears closer, thus reducing dispersion of the light rays forming the image. Vignetting is correspondingly reduced and the image does not lose its brightness or intensity. It can be appreciated that even though the optical path of the image is lengthened by the triple prism 60 in being routed in a downwardly, forwardly and outwardly direction, the solid nature of the prism 60 offsets this by reducing the effective length of the circuitous optical path.

With regard to the specific construction of prisms 62-66, prisms 64 and 66 are cemented to prism 62 with a conventional optical bonding material. Side surfaces 82 and 84 of prism 62 are coated with a conventional anti-reflection material effective between 550 and 850 nanometers. Each angled face 68, 74 and 76 is ground flat within one-half fringe and silver coated to enhance reflectivity. A protective coating is then applied over each angled face 68, 74 and 76 to assure that the silver coating cannot be easily scratched or disturbed. The sizes of the prisms can vary, depending upon the cross-sectional area of the optical path. In the preferred form of the invention, the vertical surface and horizontal surface of the prism 62 are 0.94 inch by 0.72 inch.

Fixed to the viewer frame 12 and disposed in each of the opposing horizontal optical paths 26 and 28 is a respective lens 86 and 88. Lenses 86 and 88 focus the image directed outwardly from the respective prisms 66 and 64 onto a respective pair of turning mirrors 90 and 92. The turning mirrors 90 and 92 include respective reflective surfaces 94 and 96 for again redirecting the images of the opposing lateral horizontal optical paths 26 and 28 into common parallel forward optical paths 30 and 32. The turning mirrors 90 and 92 are spaced apart about the distance of the eyes of an observer. Yet other lenses 98 and 100 are fixed within the respective eyepieces 18 and 16 of the viewing system 10 for presenting a clear and high quality image to each eye 102 and 104 of the observer. As noted above, separate diopter adjustments of the eyepieces 16 and 18 may be provided to correct for astigmatism or other traditional optical characteristics. The eyepieces 16 and 18 themselves may be individually adjustable with respect to each other for proper spacing to match that of the observer's eyes 102 and 104.

Figure 5:
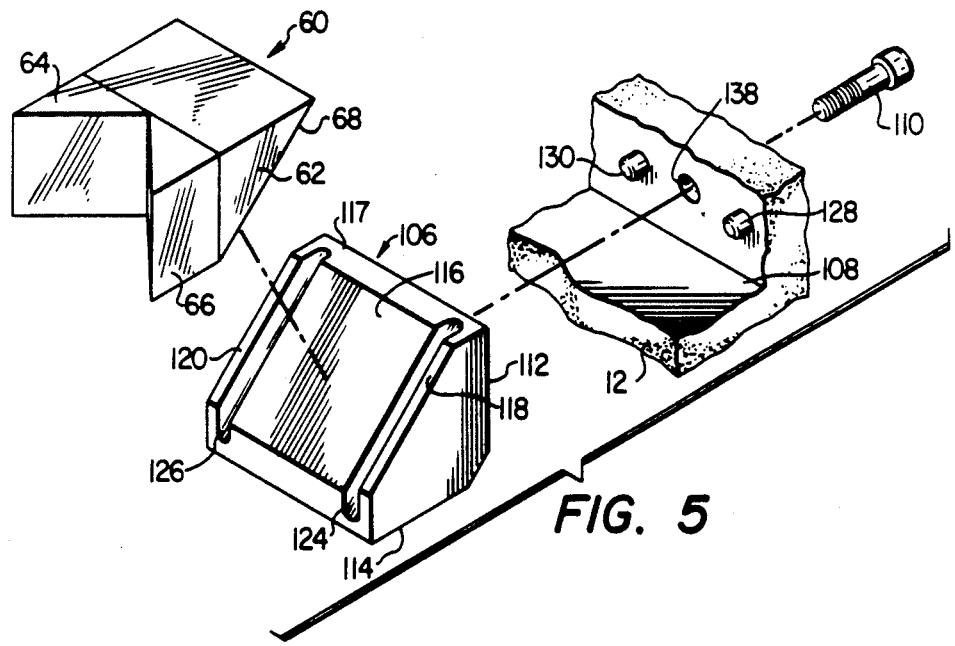
FIG. 5 is an exploded isometric view of the triple prism and associated cradle for attaching the prism to the viewing system frame.

With reference now to FIG. 5, there is shown a cross-sectional view of the triple prism 60 as mounted within the frame 12 of the viewing system 10 of the invention. Prism 62 of the triple prism 60 is fastened to a carriage block or cradle 106 which, in turn, is fixed to the frame 12 of the viewing system 10. The frame 12 includes a right angle corner 108 into which the cradle 106 is held in a registered position, and is thereby accurately placed within the vertical optical path 24. A bolt or screw 110 secures the cradle 106, and thus the triple prism 60, in a predetermined position to the viewer frame 12.

The manner in which the triple prism 60 is fastened to the frame 12 of the viewer system 10 is shown in more detail in FIG. 6. The cradle 106 includes a back side 112 orthogonal to a bottom surface 114 for resting within the corner 108 of the viewer frame 12. The cradle 106 further includes an inclined surface 116 to which the angled face 68 of prism 62 is adhered. A conventional adhesive or cement is employed to bond the triple prism 60 to the cradle 106 without damaging the reflective properties or coating of angled face 68. The cradle surface 116 is inclined with respect to the bottom surface 114 by an angle which is complementary to the angle with which the angled face 68 is formed. The prism 62 is bonded to the inclined surface 116 of the cradle 106 in such a manner that the top face of prism 62 is flush with the horizontal surface 117 of the cradle 106. Hence, the top horizontal face of prism 62 is centered within the vertical optical path 24 in an orthogonal relationship thereto.

The triple prism 60 is properly positioned laterally and adhered to the cradle 106 by the use of side shoulders 118 and 120 between which the triple prism 60 snuggly fits. The close tolerance between the inside dimensions formed by the shoulders 118 and 120 prevents any lateral movement of the triple prism 60 with respect to the vertical optical path 24. In this manner, it is assured that the image projected in opposing directions by prisms 64 and 66 will be correctly centered between the respective turning mirrors 90 and 92 (FIG. 2). Along the inside corners of the side shoulders 118 and 120 are recess channels 124 and 126 formed for accumulating excess adhesive when the adhesive-covered face 68 of triple prism 60 is pressed onto the inclined surface 116 of the cradle 106. This assures that an uneven accumulation of adhesive will not remain trapped under the angled face 68 of the triple prism 60 and thereby cant the prism 62 with respect to the vertical optical path 24.

The viewer frame 12 is provided with a pair of registration pins 128 and 130 for aligning the cradle 106 thereto. FIG. 6a illustrates a view of the back side 112 of the cradle 106 together with two oblong shaped registration slots 132 and 134 for receiving the respective frame pins 130 and 128. The cradle 106 includes within the back surface 112 thereof a threaded hole 136 for threadable engagement with the screw 110. In order to secure the prism cradle 106 to the viewer frame 12, the screw 110 is inserted into a hole 138 bored into the frame 12. The screw 110 is then threadably engaged with the threaded hole 136 of the cradle 106 and tightened, thereby securing the cradle 106 in the frame corner 108. The cradle is laterally registered by pins 128 and 130 and corresponding slots 132 and 134.

The prism cradle 106 includes a tapered corner 140, shown in FIG. 6b, for preventing misalignment of the cradle 106 with respect to the frame corner 108, should either the cradle corner or the frame corner 108 have an outwardly projecting irregularity.

FIG. 7 illustrates another embodiment of the invention, but having external reflective surfaces for forming two images from a single image. A planar reflective surface 142 is disposed in an optical path 144 in an angled manner so as to redirect the representative image toward an orthogonal path 146. The planar reflective surface 142 is oriented with respect to a prism 148 so that the image of the orthogonal optical path 146 is split by reflective prism surfaces 150 and 152. The prism surfaces 150 and 152 are formed in orthogonal planes and thus again redirect the image carried by the orthogonal optical path 146 into split opposing outwardly directed optical paths 154 and 156. Although the image splitter of FIG. 7 provides two substantially identical images 154 and 156 from a single image 144, the vignetting problem is not corrected to the degree as the triple prism 60 of FIG. 2.

It can be seen from the foregoing that an improved twin eyepiece offset viewing system has been disclosed. The head prism of the system includes a vertically elongate column of glass disposed in the optical path for preventing degradation of the image because of the dispersion of the image light rays, as commonly encountered in an air medium. The glass head prism also shortens the effective length of the optical path. The triple prism, which is also a composite glass structure without an intervening air medium, allows substantially a full image to be redirected in separate directions. In this manner, an observer has available essentially the full image in both eyepieces of the viewer. For ease of construction and reliability, the triple prism is adhered to a cradle which is secured to the viewer frame in a precise location so as to be centered in both a vertical and a horizontal optical path.

In any viewer such as the foregoing, many changes can be made which are not relevant to the novel features taught by the invention. Bearing this in mind, the specific embodiment disclosed herein is intended to be merely exemplary of the invention and not restrictive thereof since various modifications readily apparent to those familiar with the art can obviously be made without departing from the spirit and scope of the invention as claimed hereinbelow.

What is claimed is:

1. A binocular periscope viewing system, comprising:
   a frame having an upper part with an opening into which the image of an object is directed, and a lower part having a pair of openings through which the image of the object can be observed;
   a reflector fixed in the upper opening of the frame for redirecting the image of the object from a top incoming horizontal path to a vertical optical path, said reflector having an elongate glass portion disposed in the vertical optical path;
   an objective lens assembly fixed to said frame and disposed in said vertical optical path;
   an electron image intensifier;
   an integral triple prism having a first reflective surface disposed in the vertical optical path for redirecting the image forwardly in a lower horizontal optical path, a second and third reflective surface each disposed in the lower horizontal optical path for redirecting the image in opposite lateral horizontal directions orthogonal to said vertical optical path and orthogonal to said lower horizontal optical path;
   a cradle for attaching said triple prism to said frame, said cradle being fixed to said frame at a predetermined location, and including registration means for attaching said triple prism at a predetermined location on said cradle so that said triple prism is centered within the vertical optical path and the lower horizontal optical path; and
   a pair of turning reflectors each for redirecting a respective image of one of said opposite lateral horizontal directions to a common parallel forward horizontal path, the common parallel forward horizontal paths being displaced with respect to the path of the image entering the upper part of the viewer.

2. The binocular periscope of claim 1 wherein said cradle includes an incline surface engageable with an outer face of the first reflective surface.

3. The binocular periscope of claim 2 wherein said prism is attachable to said cradle by an adhesive bond.

4. The binocular periscope of claim 1 wherein said frame includes a registration pin and said cradle includes a registration receptacle matable with said pin.

5. The binocular periscope of claim 1 wherein said registration means includes a bounded area in the cradle for receiving therein at least a portion of the triple prism.

6. The binocular periscope of claim 3 further including a relief area in the incline surface for receiving excess adhesive.

7. The binocular periscope of claim 6 wherein said relief area includes a channel routed to an outside surface of said cradle.

8. A binocular periscope viewing system, comprising:
   a frame having an upper part with an opening into which the image of an object is directed, and a lower part having a pair of openings through which the image of the object can be observed;
   a reflector fixed in the upper opening of the frame for redirecting the image of the object from a top incoming horizontal path to a vertical optical path, said reflector having an elongate glass portion disposed in the vertical optical path;
   an objective lens assembly fixed to said frame and disposed in said vertical optical path;
   an electron image intensifier;
   an integral triple prism affixed to said lower part of said frame and having a first reflective surface disposed in the vertical optical path for redirecting the image forwardly in a lower horizontal optical path, a second and third reflective surface each disposed in the lower horizontal optical path for redirecting the image in opposite lateral horizontal directions orthogonal to said vertical optical path and orthogonal to said lower horizontal optical path; and
   a pair of turning reflectors each for redirecting a respective image of one said opposite lateral horizontal directions to a common parallel forward horizontal path, the common parallel forward horizontal paths being displaced with respect to the path of the image entering the upper part of the viewer.

* * * * *